United States Patent
Kang et al.

(10) Patent No.: US 11,062,604 B2
(45) Date of Patent: Jul. 13, 2021

(54) VEHICLE WARNING METHOD AND APPARATUS

(71) Applicant: ZTE CORPORATION, Guangdong (CN)

(72) Inventors: Hailei Kang, Shenzhen (CN); Wei Huang, Shenzhen (CN); Guohua Wei, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/652,376

(22) PCT Filed: Jun. 12, 2018

(86) PCT No.: PCT/CN2018/090782
§ 371 (c)(1),
(2) Date: Mar. 30, 2020

(87) PCT Pub. No.: WO2019/062206
PCT Pub. Date: Apr. 4, 2019

(65) Prior Publication Data
US 2020/0273340 A1 Aug. 27, 2020

(30) Foreign Application Priority Data
Sep. 30, 2017 (CN) .......................... 201710923225.8

(51) Int. Cl.
*G06G 1/16* (2006.01)
*H04W 4/46* (2018.01)
(Continued)

(52) U.S. Cl.
CPC .............. *G08G 1/162* (2013.01); *H04W 4/46* (2018.02); *H04W 4/80* (2018.02); *H04W 84/12* (2013.01)

(58) Field of Classification Search
CPC .......... G08G 1/162; H04W 4/46; H04W 4/80; H04W 84/12
See application file for complete search history.

(56) References Cited

U.S. PATENT DOCUMENTS 6,630,891 B1 * 10/2003 Dilling ................. G08G 1/0965
340/901
9,842,496 B1 * 12/2017 Hayward ................ G01S 19/13
(Continued)

FOREIGN PATENT DOCUMENTS

| CN | 101407199 A | 4/2009 |
| CN | 101986367 A | 3/2011 |

(Continued)

OTHER PUBLICATIONS

International Search Report of Application No. PCT/CN2018/090782—4 pages (Aug. 30, 2018).
(Continued)

*Primary Examiner* — Mohamed Barakat
(74) *Attorney, Agent, or Firm* — Knobbe, Martens, Olson & Bear, LLP (57) ABSTRACT

Disclosed are a vehicle warning method and apparatus. The method includes: acquiring real-time information of a vehicle, and determining that an anomaly happens to the vehicle; and sending anomaly information of the vehicle to a nearby terminal by means of short-range wireless communication. In the embodiments of the present disclosure, the short-range wireless communication is adopted, which is convenient and fast, has low costs, is easy to be popularized, and does not depend on 3G/4G or GPS.

18 Claims, 5 Drawing Sheets

(51) Int. Cl.
  *H04W 4/80*    (2018.01)
  *G08G 1/16*    (2006.01)
  *H04W 84/12*   (2009.01)

(56) References Cited

U.S. PATENT DOCUMENTS

2014/0143839 A1* 5/2014 Ricci .................... B60R 16/037
                                                          726/4
2015/0116133 A1* 4/2015 Mawbey ................ G08G 1/092
                                                          340/902
2016/0316353 A1   10/2016 Kawakami et al.
2017/0374690 A1* 12/2017 Maddali ................ H04W 24/02
2018/0061230 A1*  3/2018 Madigan ............... B60W 40/09

FOREIGN PATENT DOCUMENTS

| CN | 103745609 A | 4/2014 |
| CN | 104103190 A | 10/2014 |
| CN | 104426626 A | 3/2015 |
| CN | 106275142 A | 1/2017 |
| CN | 106535301 A | 3/2017 |

OTHER PUBLICATIONS

First Search Report for CN 201710923225.8.
First Office Action for CN 201710923225.8.

* cited by examiner

VEHICLE WARNING METHOD AND APPARATUS

CROSS REFERENCE TO RELATED APPLICATIONS

This is a U.S. National Stage Application, filed under 35 U.S.C. 371, of International Patent Application No. PCT/CN2018/090782, filed on Jun. 12, 2018, which claims priority to Chinese patent application No. 201710923225.8 filed on Sep. 30, 2017, contents of both of which are incorporated herein by reference in their entireties.

TECHNICAL FIELD

The present disclosure relates to, but is not limited to, communication technologies and, in particular, relates to a vehicle warning method and apparatus.

BACKGROUND

On current highways or expressways, serial traffic accidents happen for various reasons every now and then. If a nearby vehicle and a rear vehicle can be timely notified when an accident happens to a front vehicle or the front vehicle performs emergency avoidance, the chance of serial accidents can be greatly decreased.

Current intelligent driving assistance solution generally uses an on-board global positioning system (GPS) and 3G/4G network positioning and needs an addition apparatus mounted on the vehicle, to upload positioning data to a cloud server and monitor a distance between vehicles and a running status of the vehicle to determine the running status of the vehicle on the highway.

SUMMARY

Embodiments of the present disclosure provide a vehicle warning method and apparatus, to solve the problem in the existing art that an intelligent driving assistance solution is difficult to preform forecasts and alarm surrounding vehicles in time.

According to a first aspect, the embodiments of the present disclosure provide a vehicle warning method. The method includes steps described below.

Real-time information of a vehicle is acquired, and it is determined that an anomaly happens to the vehicle.

Anomaly information of the vehicle is sent to a nearby terminal by means of short-range wireless communication.

According to a second aspect, the embodiments of the present disclosure further provide a vehicle warning method. The method includes steps described below.

Anomaly information of a vehicle sent by a nearby terminal is received by means of short-range wireless communication.

Alarm information is outputted according to the anomaly information.

According to a third aspect, the embodiments of the present disclosure further provide a vehicle warning apparatus. The apparatus includes a determining module and a sending module.

The determining module is configured to acquire real-time information of a vehicle, and determine that an anomaly happens to the vehicle.

The sending module is configured to send anomaly information of the vehicle to a nearby terminal by means of short-range wireless communication.

According to a fourth aspect, the embodiments of the present disclosure further provide a vehicle warning apparatus. The apparatus includes a receiving module and a second alarm module.

The receiving module is configured to receive, by means of short-range wireless communication, anomaly information of a vehicle sent by a nearby terminal.

The second alarm module is configured to output alarm information according to the anomaly information.

According to a fifth aspect, the embodiments of the present disclosure further provide a computer-readable storage medium, which is configured to store computer-executable instructions for performing the vehicle warning method according to the first aspect.

According to a sixth aspect, the embodiments of the present disclosure further provide a computer-readable storage medium, which is configured to store computer-executable instructions for performing the vehicle warning method according to the second aspect.

Compared with the existing art, the embodiments of the present disclosure include acquiring the real-time information of the vehicle, and determining that the anomaly happens to the vehicle; and sending the anomaly information of the vehicle to the nearby terminal by means of the short-range wireless communication. In the embodiments of the present disclosure, the short-range wireless communication is adopted, which is convenient, fast and easy to be popularized, has low costs, and does not depend on 3G/4G or GPS. The communication is performed by a control bit obtained by developing Wi-Fi Direct or Bluetooth, so that the anomaly information of the vehicle can be sent out during the establishment of a local area network, which further increases an information transmitting speed. The real-time information of the vehicle is acquired by an on board diagnostics (ODB) system or other diagnosis interfaces, so the monitoring is accurate and timely. Intelligent and interconnected driving assistance can be achieved based on a terminal on the vehicle without additional costs.

Additional features and advantages of the preset disclosure will be set forth in the description which follows, and in part will be apparent from the description, or may be understood by implementing the present disclosure. The objects and other advantages of the present disclosure can be achieved and obtained through the structures especially indicated in the description, claims and drawings.

BRIEF DESCRIPTION OF THE DRAWINGS

The drawings are used for providing a further understanding of the technical solutions of the present disclosure, constitute a part of the specification, explain the technical solutions of the present disclosure in conjunction with the embodiments of the present application, and do not limit the technical solutions of the present disclosure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

The steps illustrated in the flowcharts among the drawings may be performed by a computer system such as a group of computers capable of executing instructions. Moreover, although logical sequences are illustrated in the flowcharts, the illustrated or described steps may be performed in sequences different from those described herein in some cases.

When a current intelligent driving assistance solution is applied to mountain areas, tunnels or other areas without network coverage, a monitoring difficulty will be significantly increased, and its effect will be greatly reduced. It is difficult to satisfy a requirement of real-time monitoring even with a 3G/4G network delay. In addition, if only a position and a speed are monitored, it is difficult to accurately determine a practical running condition of a vehicle, and thus it is difficult to perform forecasts or alarm a surrounding vehicle in time.

To solve at least the above technical problem, the embodiments of the present disclosure provide technical solutions described below.

Figure 1:
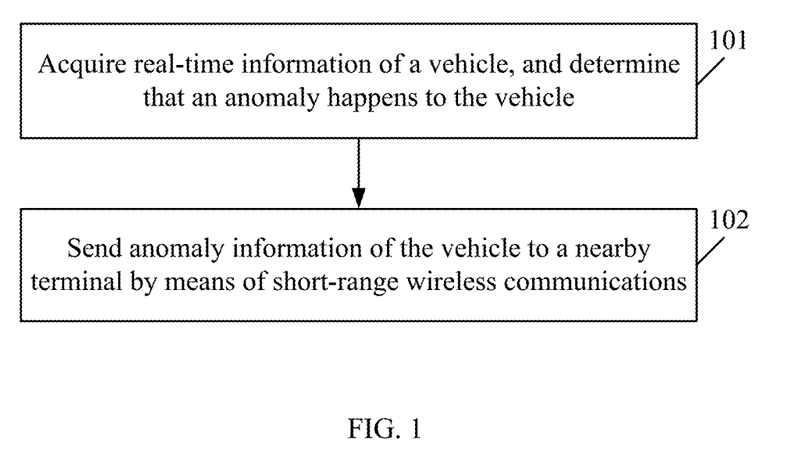
FIG. 1 is a flowchart of a vehicle warning method (at a sending end) according to an embodiment of the present disclosure.

As shown in FIG. 1, a vehicle warning method for a sending end according to an embodiment of the present disclosure includes step 101 and step 102.

In step 101, real-time information of a vehicle is acquired, and it is determined that an anomaly happens to the vehicle.

In step 102, anomaly information of the vehicle is sent to a nearby terminal by means of short-range wireless communication.

In the embodiments of the present disclosure, the short-range wireless communication is adopted, which is convenient and fast and easy to be popularized, has low costs, and does not depend on 3G/4G or a GPS.

The sending end is a terminal on the vehicle, and may be a smart terminal that runs an Android operating system, an iOS operating system, a Windows operating system or other operating systems, such as a smartphone, a mobile computer, a tablet computer, and a personal digital assistant (PDA).

In an embodiment, the real-time information of the vehicle is acquired by at least one of: an on-board control and diagnosis system, a sensor of the terminal on the vehicle, the GPS or a wireless network.

The on-board control and diagnosis system may include at least one of: an ODB system and interface, an on-board control computer, an on-board electronic control unit (ECU) or an on-board microcomputer system.

In the embodiments of the present disclosure, the real-time information of the vehicle is acquired by the ODB or other diagnosis interfaces, monitoring is accurate and timely; and intelligent and interconnected driving assistance can be achieved based on the terminal for the vehicle without additional costs.

Information such as a speed of the vehicle, an acceleration of the vehicle, an engine speed, a working status of the engine, and a working status of a gear box may be obtained by the on-board control and diagnosis system.

The sensor may include at least one of: an acceleration sensor, a gravity sensor, a light sensor, an infrared sensor or a gyroscope.

Information such as the speed and the acceleration of the vehicle may be obtained by the sensor of the terminal on the vehicle.

Position information of the vehicle may be obtained by the GPS and the wireless network.

To record a driving status and trajectory of the vehicle in detail, the short-range wireless communication (wireless local area network) may be combined with the GPS and a 3G/4G/5G network to form multi-network coverage, combination and collaboration.

In an embodiment, the real-time information of the vehicle includes at least one of: the speed of the vehicle, the acceleration of the vehicle, the engine speed, the working status of the engine, the working status of the gear box or the position information of the vehicle.

In an embodiment, the step in which the real-time information of the vehicle is acquired, and it is determined that the anomaly happens to the vehicle includes a step described below.

It is determined whether a preset condition is satisfied according to the real-time information of the vehicle, and it is determined that the anomaly happens to the vehicle if the preset condition is satisfied.

In an embodiment, the preset condition includes at least one of conditions described below.

A fault happens to the vehicle.

A reduction amount of the speed of the vehicle within specified time is greater than a speed change threshold.

A negative acceleration of the vehicle is greater than an acceleration threshold.

The preset condition may refer to the fault happening to the vehicle, a traffic accident happening to the vehicle, emergency braking of the vehicle or the like.

The fault happening to the vehicle may include problems of components such as the engine and the gear box in the vehicle.

If the speed of the vehicle decreases rapidly within a short period of time, it indicates that a collision might occur or the vehicle is performing the emergency braking, or if the negative acceleration increases rapidly, it indicates that the vehicle is performing the emergency braking, which may be determined according to whether the reduction amount of the speed of the vehicle within the specified time is greater than the speed change threshold or whether the negative acceleration of the vehicle is greater than the acceleration threshold.

When the preset condition is satisfied, a certain type of emergency is triggered, and the nearby terminal is immediately notified by means of the short-range wireless communication. A driver is prompted to take necessary measures through a display mechanism or an audio system of the terminal or other necessary measures.

The anomaly information may be information indicating that a certain component of the vehicle faults, or an accident occurs, or the emergency braking is being performed.

In an embodiment, the step in which the anomaly information of the vehicle is sent to the nearby terminal by means of the short-range wireless communication includes at least one of steps described below.

A wireless local area network is established with the nearby terminal by means of the short-range wireless communication, and the anomaly information of the vehicle is sent to the terminal during the establishment of the local area network.

The wireless local area network is established with the nearby terminal by means of the short-range wireless communication, and the anomaly information of the vehicle is sent to the terminal after the local area network is established.

In an embodiment, the short-range wireless communication includes at least one of: wireless fidelity (Wi-Fi) Direct or Bluetooth.

With the maximum transmit power, a networking coverage range of the current Wi-Fi Direct or Bluetooth can reach a maximum coverage range of for example, hundreds of meters or even several kilometers, which means that terminals within this range can form a network. In case of an emergency, a rear vehicle or a vehicle on an opposite lane may be prompted in time that an accident has occurred in front. Greater losses and casualties are avoided.

In an embodiment, in a case where the short-range wireless communication is the Wi-Fi Direct, the method further includes at least one of steps described below.

A terminal alarm traffic information attribute item is added in a peer-to-peer (P2P) attribute information field of information elements in a frame body of a Probe Request frame.

The terminal alarm traffic information attribute item is added in a P2P attribute information field of information elements in a frame body of a Probe Response frame.

In an embodiment, the step in which the anomaly information of the vehicle is sent to the terminal within the wireless local area network during the establishment of the local area network includes a step described below.

In a device discovery stage of the Wi-Fi Direct, the anomaly information of the vehicle is carried in the terminal alarm traffic information attribute item to be sent to the terminal within the wireless local area network.

In an embodiment, the step in which the anomaly information of the vehicle is carried in the terminal alarm traffic information attribute item includes a step described below.

The anomaly information of the vehicle is converted into a terminal traffic alarm information code to be carried in the terminal alarm traffic information attribute item.

When the short-range wireless communication is the Wi-Fi Direct, a software system running in the smart terminal makes the Wi-Fi Direct be in a Scan mode and performs full-channel scanning. Then a Find mode includes a Search stage and a Listen stage, which are performed in turn. The Search stage is similar to Scan. A difference is that in the Search stage, only channels 1, 6 and 11 are scanned, and it is determined whether a received Probe Response frame and a received Beacon frame include a P2P IE. In the Listen stage, the three channels 1, 6 and 11 are randomly listened to and a Probe Request including the P2P IE is responded to. Time for Listen is n*100 time units (Tus), where 802.11 specifies that 1TU=1024 microseconds which is about 1 millisecond, and n is a random integer. Therefore, duration of Listen is about an integer multiple of 100 milliseconds. A purpose of a random number here is to enable both parties to find each other. Otherwise, if both parties are in a Search state or a Listen state at the same time, the other party will never be scanned. The random number can always enable both parties to quickly find each other.

To facilitate the rapid establishment of the wireless local area network, the embodiments of the present disclosure propose to extend a structure of the Probe Request frame or the Probe Response frame and add a terminal traffic alarm information attribute to P2P attribute information of the information elements in the frame body in the device discovery stage of the Wi-Fi Direct, so that when a device discovery of the Wi-Fi Direct is completed, basic communication traffic performance of a Wi-Fi Direct terminal is also obtained. After a Wi-Fi Direct device is connected, a user may conveniently exchange information with the connected terminal according to terminal traffic alarm information parsed and stored.

In the embodiments of the present disclosure, a reserved value of a standard protocol is redefined in an attribute value (Attribute ID) of the information elements (P2P IE) in a Wi-Fi Direct frame, where reserved value 110 indicates a traffic performance attribute of the terminal; meanwhile, a specific terminal alarm traffic code is defined as an extension item of the P2P attribute information field.

Figure 2:
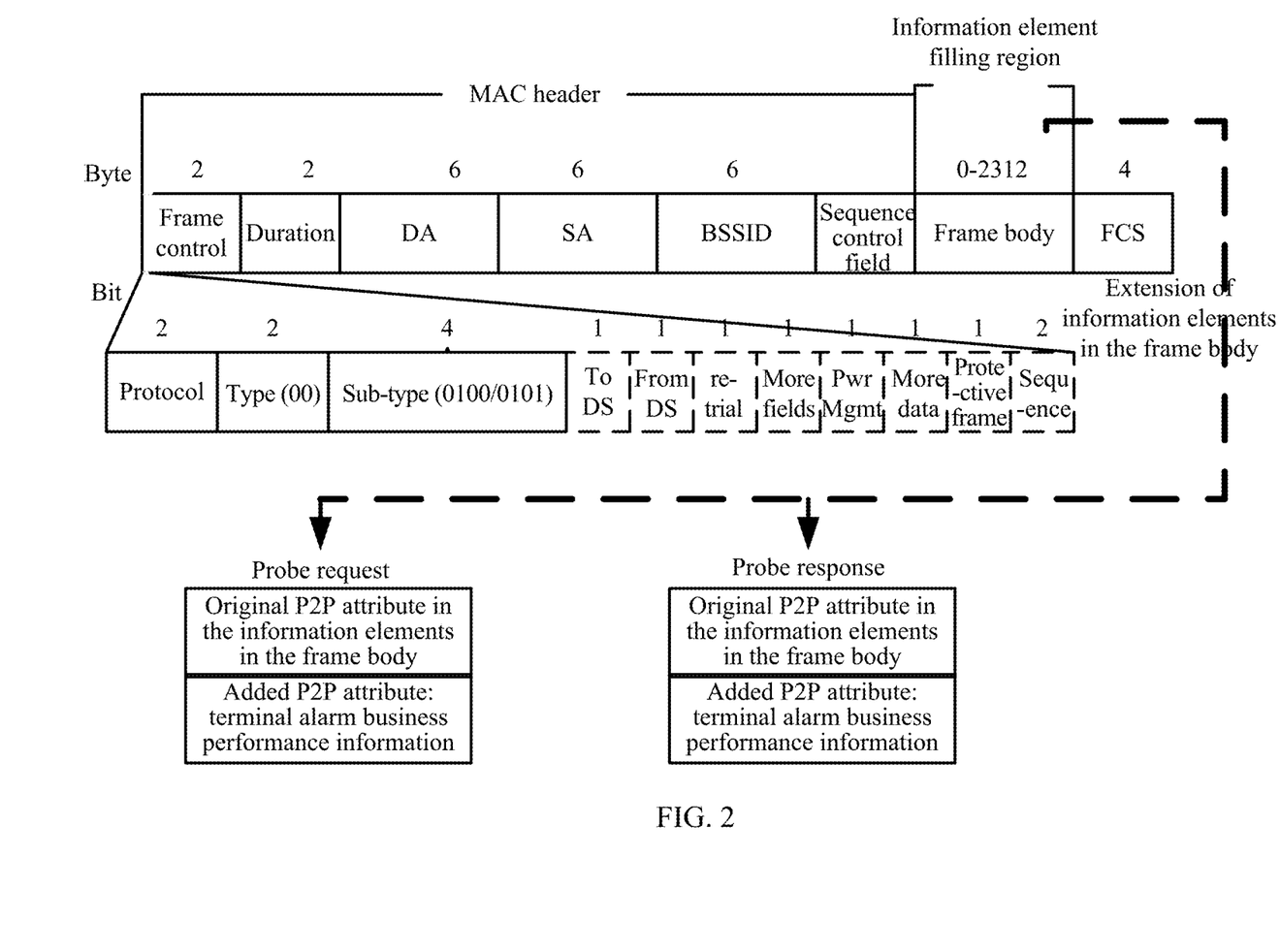
FIG. 2 is a structural diagram of an extended frame according to an embodiment of the present disclosure.

As shown in FIG. 2, the information elements in the frame body of the Probe Request frame and the Probe Response frame used in a device discovery process of the Wi-Fi Direct are extended and reconstructed, and the defined terminal alarm information is added based on that the P2P IE in the frame body is defined in standards.

In an embodiment, in a case where the short-range wireless communication is the Bluetooth, the method further includes a step described below.

The terminal alarm traffic information attribute item is added in an attribute information field of information elements in a frame body of a probe information frame.

In an embodiment, the step in which the anomaly information of the vehicle is sent to the terminal within the wireless local area network during the establishment of the local area network includes a step described below.

In a device discovery stage of the Bluetooth, the anomaly information of the vehicle is carried in the terminal alarm traffic information attribute item and is sent to the terminal within the wireless local area network.

In an embodiment, the step in which the anomaly information of the vehicle is carried in the terminal alarm traffic information attribute item includes a step described below.

The anomaly information of the vehicle is converted into the terminal traffic alarm information code and is carried in the terminal alarm traffic information attribute item.

When the short-range wireless communication is the Bluetooth, the software system running in the smart terminal puts the Bluetooth in the Scan mode and performs channel scanning when devices based on a Bluetooth protocol perform information interactions and networking. Then the Search stage and the Listen stage are performed in turn. If a certain Bluetooth device is broadcasting, the Bluetooth device will not respond to current device scanning, and meanwhile the device that is broadcasting is allowed to be connected to a device that is performing scanning, thereby effectively avoiding repeated scanning. Time of an information transfer process can be significantly reduced in a connection establishment process for Bluetooth devices by improving a connection mechanism. Therefore, devices within a radio frequency coverage range of the Bluetooth can quickly find one another and interact alarm information by a code word in a reserved field. Meanwhile, the Bluetooth can quickly start a connector with an application and close a connection immediately after completing the approved data transfer within several milliseconds. However, under a traditional Bluetooth protocol, it even takes 100 ms to establish merely a link layer connection, and it takes more time to establish a logical link control and adaptation protocol (L2CAP) layer connection.

To facilitate the rapid establishment of the wireless local area network, the embodiments of the present disclosure propose to expand a structure of the probe information frame and add a terminal alarm traffic performance information attribute to attribute information of the information elements in the frame body in the device discovery stage of the Bluetooth, so that when a device discovery of the Bluetooth is completed, traffic performance of a Bluetooth terminal is also obtained. After a Bluetooth device is connected, the user may conveniently perform information exchange and interconnected control on the connected terminal according to terminal alarm traffic performance information parsed and stored.

In the embodiments of the present disclosure, communication is performed by a control bit extended for the Wi-Fi Direct or the Bluetooth, so that the anomaly information of the vehicle can be sent out during the establishment of the local area network, which further increases an information dissemination speed.

In an embodiment, the step in which the anomaly information of the vehicle is sent to the nearby terminal by means of the short-range wireless communication includes a step described below.

The anomaly information of the vehicle is sent by an external radio frequency signal amplifying device of the terminal or an on-board radio frequency signal amplifying device.

The external radio frequency signal amplifying device of the smart terminal or an on-board radio frequency signal amplifying apparatus may be equipped at the same time to extend a coverage range of the wireless local area network.

In an embodiment, the establishment of the wireless local area network includes a step described below.

The terminal within the local area network is bound by means of authentication and authorization.

In an embodiment, the step of sending the anomaly information of the vehicle to the nearby terminal by means of the short-range wireless communication includes a step described below.

The anomaly information is sent by means of information encryption.

In the embodiments of the present disclosure, the user is bound by means of authentication and authorization, and information encryption is used to ensure security of information dissemination within the local area network.

In an embodiment, the method further includes a step described below.

Alarm information is outputted according to the anomaly information.

Here outputting the alarm information refers to not only notifying a receiving end (the nearby terminal) but also alarming the terminal for the vehicle to enable the driver to take measures in time.

In an embodiment, the step in which the alarm information is outputted according to the anomaly information includes at least one of steps described below.

Video alarm information is outputted according to the anomaly information.

Audio alarm information is outputted according to the anomaly information.

The video alarm information may include displaying an alarm prompt box, playing an alarm animation video and the like.

The audio alarm information may be playing a voice for prompting the alarm message, playing a specified alarm sound or the like.

In the embodiments described above, based on a Wi-Fi Direct protocol or Bluetooth protocol supported by the smart terminal, multiple smart terminals are linked to form the wireless local area network without the GPS or the 3G/4G network coverage, and the software system running on the smart terminal acquires, by the ODB interface or the on-board ECU or the on-board microcomputer system or other control and diagnosis systems, engine running information of the vehicle, the speed of the vehicle and other sensor information of the vehicle in real time, processes the preceding information in conjunction with the acquired same type of information of other vehicles, determines a running status of the vehicle, and notifies other vehicles within the wireless local area network and warns the driver in case of emergency, so as to avoid serial accidents or other forms of personnel and property damages.

Figure 3:
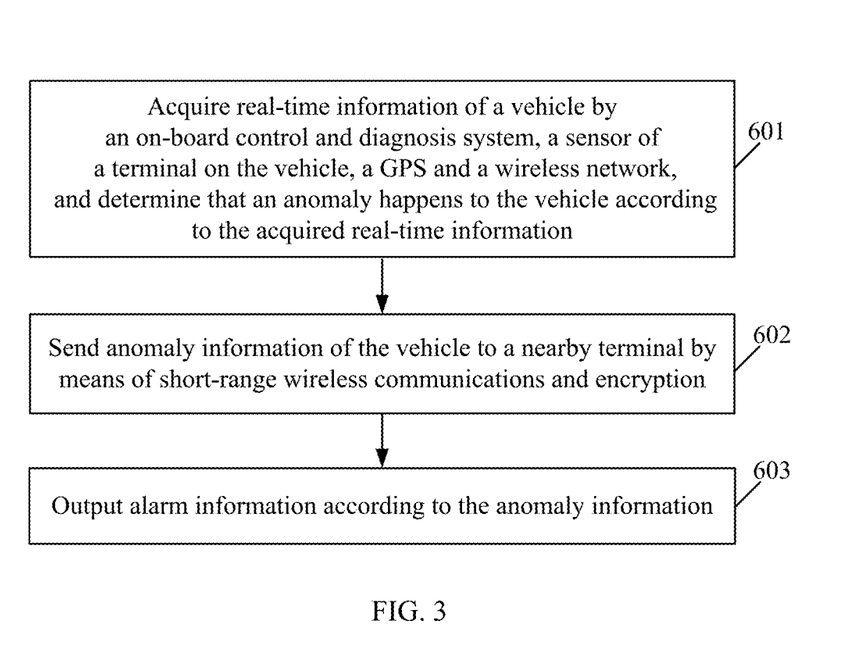
FIG. 3 is an overall flowchart of a vehicle warning method according to an embodiment of the present disclosure.

A general rough description of a process on the sending end side is provided below in conjunction with a process of the above-mentioned vehicle warning method. As shown in FIG. 3, the process mainly includes steps described below.

In step 601, real-time information of a vehicle is acquired by an on-board control and diagnosis system, a sensor of a terminal on the vehicle, a GPS and a wireless network, and it is determined that an anomaly happens to the vehicle according to the acquired real-time information.

In step 602, anomaly information of the vehicle is sent to a nearby terminal by means of short-range wireless communication and encryption.

In step 603, alarm information is outputted according to the anomaly information.

In an optional embodiment, step 601 may be implemented by determining whether a preset condition is satisfied according to the real-time information of the vehicle, and determining that the anomaly happens to the vehicle in a case where the preset condition is satisfied.

In an optional embodiment, step 602 may be implemented in a manner described below.

A wireless local area network is established with the nearby terminal by means of the short-range wireless communication, and the anomaly information of the vehicle is sent to the terminal during the establishment of the local area network.

The wireless local area network is established with the nearby terminal by means of the short-range wireless communication, and the anomaly information of the vehicle is sent to the terminal after the local area network is established.

In a case where the short-range wireless communication is Wi-Fi Direct, a terminal alarm traffic information attribute item is added in a peer-to-peer (P2P) attribute information field of information elements in a frame body of a Probe Request frame; and the terminal alarm traffic information attribute item is added in a P2P attribute information field of information elements in a frame body of a Probe Response frame. Furthermore, based on the technical solution in the embodiments described above, the step in which the anomaly information of the vehicle is sent to the terminal within the wireless local area network during the establishment of the local area network includes the following step: in a device discovery stage of the Wi-Fi Direct, the anomaly information of the vehicle is carried in the terminal alarm traffic information attribute item and sent to the terminal within the wireless local area network.

In a case where the short-range wireless communication is Bluetooth, the terminal alarm traffic information attribute item is added in an attribute information field of information elements in a frame body of a probe information frame. Furthermore, based on the technical solution described above, the step in which the anomaly information of the vehicle is sent to the terminal within the wireless local area network during the establishment of the local area network includes the following step: in a device discovery stage of the Bluetooth, the anomaly information of the vehicle is carried in the terminal alarm traffic information attribute item and sent to the terminal within the wireless local area network.

Figure 4:
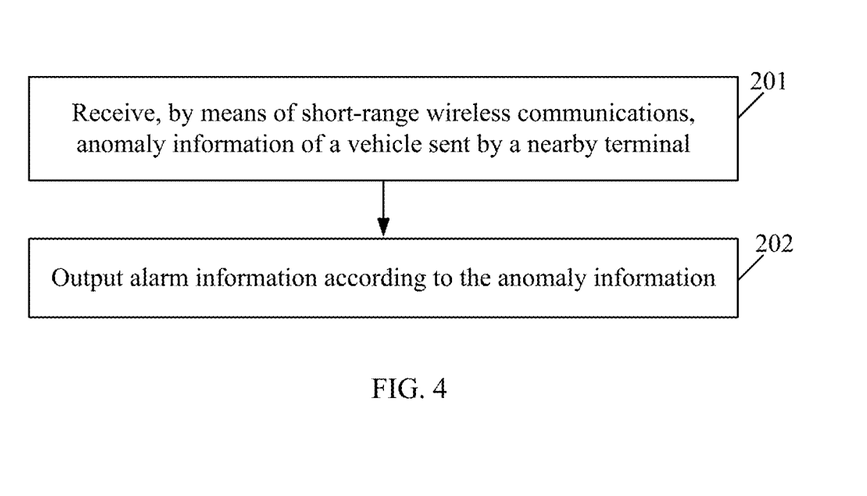
FIG. 4 is a flowchart of a vehicle warning method (at a receiving end) according to an embodiment of the present disclosure.

As shown in FIG. 4, according to an embodiment of the present disclosure, a vehicle warning method for a receiving end includes step 201 and step 202.

In step 201, anomaly information of a vehicle sent by a nearby terminal is received by means of short-range wireless communication.

In step 202, alarm information is outputted according to the anomaly information.

In the embodiments of the present disclosure, the short-range wireless communication is adopted, which is convenient, fast and easy to be popularized, has low costs, and does not depend on 3G/4G or a GPS.

The receiving end is a terminal on the vehicle, and may be a smart terminal that runs an Android operating system, an iOS operating system, a Windows operating system or other operating systems, such as a smartphone, a mobile computer, a tablet computer, and a personal digital assistant (PDA).

In an embodiment, the step in which the anomaly information of the vehicle sent by the nearby terminal is received by means of the short-range wireless communication includes at least one of steps described below.

A wireless local area network is established with the nearby terminal by means of the short-range wireless communication, and the anomaly information of the vehicle sent by the terminal is received during the establishment of the local area network.

The wireless local area network is established with the nearby terminal by means of the short-range wireless communication, and the anomaly information of the vehicle sent by the terminal is received after the local area network is established.

In an embodiment, the short-range wireless communication includes at least one of: wireless fidelity (Wi-Fi) Direct or Bluetooth.

In an embodiment, in a case where the short-range wireless communication is the Wi-Fi Direct, the step in which the anomaly information of the vehicle sent by the terminal is received during the local area network is established includes steps described below.

In a device discovery stage of the Wi-Fi Direct, a Probe Request frame is received, and the anomaly information is acquired according to a terminal alarm traffic information attribute item in a peer-to-peer (P2P) attribute information field of information elements in a frame body of the Probe Request frame.

In an embodiment, the step in which the anomaly information is acquired according to the terminal alarm traffic information attribute item in the P2P attribute information field of the information elements in the frame body of the Probe Request frame includes a step described below.

A terminal traffic alarm information code carried in the terminal alarm traffic information attribute item is parsed to acquire the anomaly information.

In an embodiment, in a case where the short-range wireless communication is the Wi-Fi Direct, the step in which the anomaly information of the vehicle sent by the terminal is received during the establishment of the local area network includes steps described below.

In the device discovery stage of the Wi-Fi Direct, a Probe Response frame is received, and the anomaly information is acquired according to the terminal alarm traffic information attribute item in a P2P attribute information field of information elements in a frame body of the Probe Response frame.

In an embodiment, the step in which the anomaly information is acquired according to the terminal alarm traffic information attribute item in the P2P attribute information field of the information elements in the frame body of the Probe Response frame includes a step described below.

The terminal traffic alarm information code carried in the terminal alarm traffic information attribute item is parsed to acquire the anomaly information.

In an embodiment, in a case where the short-range wireless communication is the Bluetooth, the step in which the anomaly information of the vehicle sent by the terminal is received during the establishment of the local area network includes steps described below.

In a device discovery stage of the Bluetooth, a probe information frame is received, and the anomaly information is acquired according to the terminal alarm traffic information attribute item in an attribute information field of information elements in a frame body of the probe information frame.

In an embodiment, the step in which the anomaly information is acquired according to the terminal alarm traffic information attribute item in the attribute information field of the information elements in the frame body of the probe information frame includes a step described below.

The terminal traffic alarm information code carried in the terminal alarm traffic information attribute item is parsed to acquire the anomaly information.

In an embodiment, the method further includes a step described below.

When a discovered terminal is displayed, associated terminal traffic alarm information is displayed, where the terminal traffic alarm information corresponds to the terminal traffic alarm information code.

In an embodiment, the step in which the anomaly information of the vehicle sent by the nearby terminal is received by means of the short-range wireless communication includes a step described below.

The anomaly information of the vehicle is received by an external radio frequency signal amplifying device of the terminal or an on-board radio frequency signal amplifying device.

In an embodiment, the step in which the alarm information is outputted according to the anomaly information includes at least one of steps described below.

Video alarm information is outputted according to the anomaly information.

Audio alarm information is outputted according to the anomaly information.

The video alarm information may include displaying an alarm prompt box, playing an alarm animation video and the like.

The audio alarm information may be playing a voice for prompting the alarm message, playing a specified alarm sound or the like.

In the embodiments described above, based on a Wi-Fi Direct protocol or a Bluetooth protocol supported by the smart terminal, multiple smart terminals are linked to form the wireless local area network without the GPS or 3G/4G network coverage, and a software system run by the smart terminal receives the anomaly information sent by another vehicle within the wireless local area network and warns a driver, so as to avoid serial accidents or other forms of personnel and property damages.

A general process of the vehicle warning method on the side of the receiving end corresponds to that for a sending end, and other limitations are not made in the embodiments of the present disclosure herein.

In an example in which the sending end and the receiving end are smart terminals, the vehicle warning method in an application example of the present disclosure includes steps 301, 302 and 303.

In step 301, a software system running on the smart terminal reads real-time information of a vehicle by an ODB module/interface. The real-time information of the vehicle includes an engine speed and a working condition of an engine, a working status of a gear box, a speed and an acceleration of the vehicle, and working statuses of other subsystems. While the above data is monitored, a status of the vehicle is calculated and determined according to data collected in real time to determine whether the vehicle is running at a normal running status.

As for the ODB module/interface, the ODB module is a standard on-board module, provides data required by the software system of the smart terminal, and diagnoses a running status of the vehicle and running statuses of key components and mechanisms. When a problem occurs, a corresponding error code is generated and may be acquired by the ODB interface.

In step 302, when the software system detects that an anomaly happens to the vehicle, the software system sends a fault status and fault information of the vehicle within a local area network via WI-FI Direct or Bluetooth.

In step 303, when another smart terminal receives the fault information and a fault prompt, a driver will be notified through an audio system and a video display device on the smart terminal that an emergency has happened to a front or nearby vehicle, so that the driver is prompted to take necessary measures to control a vehicle.

In an application example of the present disclosure, a link between smart terminals based on a Wi-Fi Direct protocol is implemented by steps described below.

In step 401, traffic performance of a terminal is defined, a reserved value of a standard protocol is redefined in an attribute value (Attribute ID) of information elements (P2P IE) in a Wi-Fi Direct frame, where reserved value 110 indicates a traffic performance attribute of the terminal, and meanwhile, a specific terminal alarm traffic code is defined as an extension item of a P2P attribute information field.

In step 402, frame information is extended, information elements in a frame body of a Probe Request frame and/or a Probe Response frame used in a device discovery process of Wi-Fi Direct are extended and modified, and defined terminal alarm information is added in the standard where the P2P IE in the frame body is defined.

In step 403, in a device discovery stage of the Wi-Fi Direct, when a probe information frame is received, it is determined whether it is the Probe Request frame or the Probe Response frame for exchanging device information, and it is checked whether an information element item of the frame includes the extension defined in step 401. If it is the extended frame defined in step 401, the added terminal alarm traffic information item is parsed and the parsed information is stored. If it is determined to be an un-extended frame, the frame is still processed according to an original parsing method.

In step 404, after the frame information is parsed, terminal alarm traffic performance information is stored on the terminal. When the terminal alarm traffic performance information is stored on the terminal, an address of the terminal, a name of the terminal and a terminal traffic alarm information code are associated; and meanwhile, when a discovered device is displayed on the terminal, associated terminal traffic alarm information is displayed.

In step 405, after a user has established connection with a discovered Wi-Fi Direct terminal device, alarm traffic performance associated with the connected terminal is queried; if the connected terminal has no associated alarm traffic performance, it is a common Wi-Fi Direct terminal device; and if the connected terminal already has the associated alarm traffic performance, information exchange, an alarm and a broadcast may be performed.

In an application example of the present disclosure, a link between smart terminals based on a Bluetooth system is implemented by steps described below.

In step 501, traffic performance of a terminal is defined, a reserved value of a standard protocol is redefined in an information frame of information elements in a Bluetooth protocol frame, where reserved value 310 indicates a traffic performance attribute of the terminal, and meanwhile, a specific terminal alarm traffic code is defined as an extension item of a frame information field.

In step 502, frame information is extended, information elements in part of a probe information frame used in a device discovery process of Bluetooth are extended and reconstructed, and terminal alarm information defined in step 501 is added in the standard where information in the frame body is defined.

In step 503, in a device discovery stage of the Bluetooth, when the probe information frame is received, it is determined whether it has a probe information frame structure for exchanging device information, and it is checked whether an information element item of the frame includes the extension defined in step 501. If it is the extended frame defined in step 501, the added terminal alarm traffic information item is parsed and the parsed information is stored. If it is determined to be an un-extended frame, the frame is still processed according to an original parsing method.

In step 504, after the frame information is parsed, terminal traffic performance information is stored on the terminal. When the terminal traffic performance information is stored on the terminal, an address of the terminal, a name of the terminal and a terminal alarm traffic performance code are associated; and meanwhile, when a discovered device is displayed on the terminal, associated alarm traffic performance information is displayed.

In step 505, after a user has connected a discovered Bluetooth device, alarm traffic performance associated with the connected terminal is queried; if the connected terminal has no associated alarm traffic performance, it is a common Bluetooth terminal device; and if the connected terminal already has the associated alarm traffic performance, alarm information exchange or connection control may be performed.

To sum up, the embodiments of the present disclosure may include: (1) a smart terminal supporting Wi-Fi Direct or Bluetooth, (2) a software system running on the smart terminal, (3) an ODB system and interface, and (4) an on-board control computer, an on-board ECU, an on-board microcomputer system or other control and diagnosis systems. The software system on the smart terminal may determine a driving status and trajectory of a vehicle by detecting data from an acceleration sensor, a gravity sensor, a light sensor, an infrared sensor, a gyroscope and other sensors on the smart terminal as well as network and position information, reads dynamic information of the vehicle in cooperation with the ODB system, the on-board control computer, the on-board electronic control unit (ECU), the on-board microcomputer system or other control and diagnosis systems to further determine a speed and an acceleration of the vehicle, a running status of an engine, a running status of a gear box, and statuses of other sensors and vehicle subsystems. The software system determines a running status of the vehicle and whether an accident happens according to the above data collected in real time. Therefore, when a fault or a traffic accident happens to the vehicle, the smart terminal may immediately acquire status information of the vehicle without any delay. Based on a Wi-Fi Direct or Bluetooth networking protocol, the software system may provide timely alarm information through Wi-Fi Direct or Bluetooth to front and rear vehicles and warns other drivers to take necessary measures in this small-scale wireless network.

Implementation example one: in a case where a complete network connection has not been established through Wi-Fi Direct, an external enhanced antenna is used for increasing a coverage range and transferring alarm information.

In the case where the complete network connection has not been established through the Wi-Fi Direct, a connection is quickly established and alarm information is sent between device A and device B.

When a vehicle has been started, an external radio frequency amplifying apparatus is connected to device A, an ODB system and interface are checked to ensure that outputs and connections of the ODB system and interface are normal, and then a smart terminal device equipped with the software system described above is turned on and the software system is started. The software system will monitor and process various parameters and information from the ODB system in real time, and the software system performs real-time continuous monitoring of systems of the vehicle. If the vehicle performs emergency braking or has a fault with its engine, the software system will immediately determine an anomalous condition. A Wi-Fi Direct module in the smart terminal has been reconfigured during initialization, and reserved bytes in a standard protocol are extended as an alarm information code. At the time of the emergency braking or other anomalies, an alarm message is quickly sent in conjunction with a decision result of the software system through a Wi-Fi Direct probe mechanism. When a device B is located within a coverage range of the network, the device B will receive alarm information from a device A through the Wi-Fi Direct, and a software system in a smart terminal reminds a driver to take necessary avoidance and taboo measures.

Implementation example two: in a case where a network connection has been established through Wi-Fi Direct, an on-board enhanced antenna is used for increasing a coverage range and transferring alarm information.

In the case where the network connection has been established through the Wi-Fi Direct, information interactions are quickly performed and alarm information is sent between a device A and a device B.

When a vehicle has been started, an external on-board radio frequency amplifying apparatus is connected to the device A, an ODB system and interface are checked to ensure that outputs and connections of the ODB system and interface are normal, or an on-board control computer, an on-board ECU, an on-board microcomputer system or other control and diagnosis systems are used.

A smart terminal device equipped with the software system described above is turned on and the software system is started. The software system may determine a driving status and trajectory of the vehicle by detecting data from an acceleration sensor, a gravity sensor, a light sensor, an infrared sensor, a gyroscope and other sensors on the smart terminal as well as network and position information. The software system will monitor and process various parameters and information from the ODB system, the on-board control computer, the on-board ECU, the on-board microcomputer system or other control and diagnosis systems in real time, and the software system performs real-time continuous monitoring of systems of the vehicle. If a collision or a system fault happens to the vehicle, the software system will immediately determine an anomalous condition. A Wi-Fi Direct module in the smart terminal has been reconfigured during initialization, and reserved bytes in a standard protocol are extended as an alarm information code. In this case, a Wi-Fi network has been normally connected, and thereby interaction information can be sent through normal network connection and protocol. When the collision or the system fault happens to the vehicle, an alarm message is quickly sent in conjunction with a decision result of the software system through a Wi-Fi Direct probe mechanism. When the device B is located within a coverage range of the network, the device B will receive alarm information from the device A through the Wi-Fi Direct, and the software system in the smart terminal advises a driver to take necessary avoidance and taboo measures.

Implementation example three: an embodiment based on a Bluetooth system

In a case where a network connection has been established through Bluetooth, information interactions are quickly performed and alarm information is sent between a device A and a device B.

When a vehicle has been started, an external on-board radio frequency amplifying apparatus is connected to the device A, an ODB system and interface are checked to ensure that outputs and connections of the ODB system and interface are normal, or an on-board control computer, an on-board ECU, an on-board microcomputer system or other control and diagnosis systems are used. A user is bound by means of authentication and authorization, and information encryption is used to ensure security of information dissemination within a local area network.

A smart terminal device equipped with the software system described above is turned on and the software system is started. The software system may determine a driving status and trajectory of the vehicle by detecting data from an acceleration sensor, a gravity sensor, a light sensor, an infrared sensor, a gyroscope and other sensors on a smart terminal as well as network and position information. The software system will monitor and process various parameters and information from the ODB system, the on-board control computer, the on-board ECU, the on-board microcomputer system or other control and diagnosis systems in real time, and the software system performs real-time continuous monitoring of systems of the vehicle. If a collision or a system fault happens to the vehicle, the software system will immediately determine an anomalous condition. A Bluetooth module in the smart terminal has been reconfigured during initialization, and reserved bytes in a standard protocol are extended as an alarm information code. In this case, a Bluetooth network has been normally connected, and thereby interaction information can be sent through normal network connection and protocol. When the collision or the system fault happens to the vehicle, an alarm message is quickly sent in conjunction with a decision result of the software system through a Bluetooth probe mechanism. When the device B is located within a coverage range of the network, the device B will receive alarm information from the device A through the Bluetooth, and the software system in the smart terminal advises a driver to take necessary avoidance and taboo measures.

Implementation example four: in a case where a complete network connection has not been established through Wi-Fi Direct, an external enhanced antenna is used in conjunction with a GPS and a 3G/4G/5G network for increasing a coverage range and transferring alarm information.

In the case where the complete network connection has not been established through the Wi-Fi Direct, a connection is quickly established and alarm information is sent between a device A and a device B. A user is bound by means of authentication and authorization, and information encryption is used to ensure security of information dissemination within a local area network.

When a vehicle has been started, an external radio frequency amplifying apparatus is connected to the device A, an ODB system and interface, an on-board control computer, an on-board ECU, an on-board microcomputer system or other control and diagnosis systems are checked to ensure that their outputs and connections are normal, and then a smart terminal device equipped with the software system described above is turned on and the software system is started. The software system will monitor and process various parameters and information from the ODB system, the on-board control computer, the on-board ECU, the on-board microcomputer system or other control and diagnosis systems in real time, and the software system continuously monitors systems of the vehicle in real-time. Meanwhile, the software system monitors a running state and trajectory of the vehicle by the GPS and the 3G/4G/5G. The software system also determines a running condition and a real-time status of the vehicle according to the trajectory, a position, and parameters and statuses of various sensors described above.

If the vehicle performs emergency braking or has a fault with its engine, the software system will immediately determine an anomalous condition. A Wi-Fi Direct module in the smart terminal has been reconfigured during initialization, and reserved bytes in a standard protocol are extended as an alarm information code. At the time of the emergency braking or other anomalies, an alarm message is quickly sent in conjunction with a decision result of the software system through a Wi-Fi Direct probe mechanism. When the device B is located within a coverage range of the network, the device B will receive alarm information from the device A through the Wi-Fi Direct, and the software system in the smart terminal advises a driver to take necessary avoidance and taboo measures.

Figure 5:
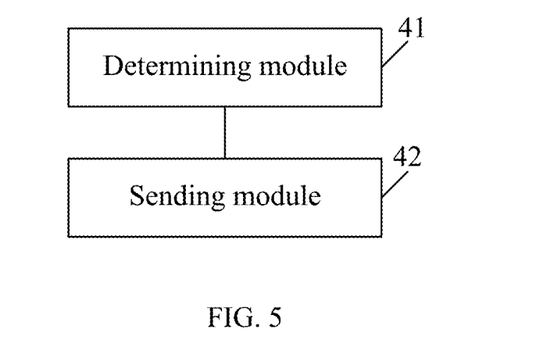
FIG. 5 is a schematic diagram of a vehicle warning apparatus (at a sending end) according to an embodiment of the present disclosure.

As shown in FIG. 5, the embodiments of the present disclosure further provide a vehicle warning apparatus. The apparatus includes a determining module 41 and a sending module 42.

The determining module 41 is configured to acquire real-time information of a vehicle, and determine that an anomaly happens to the vehicle.

The sending module 42 is configured to send anomaly information of the vehicle to a nearby terminal by means of short-range wireless communication.

In an embodiment, the determining module 41 is configured to acquire the real-time information of the vehicle by at least one of: an on-board control and diagnosis system, a sensor of a terminal on the vehicle, a global positioning system (GPS) or a wireless network.

In an embodiment, the determining module 41 is configured to determine whether a preset condition is satisfied according to the real-time information of the vehicle, and determine that the anomaly happens to the vehicle in a case where the preset condition is satisfied.

In an embodiment, the preset condition includes at least one of conditions described below.

A fault happens to the vehicle.

A reduction amount of a speed of the vehicle within specified time is greater than a speed change threshold.

A negative acceleration of the vehicle is greater than an acceleration threshold.

In an embodiment, the sending module 42 is configured to send the anomaly information of the vehicle to the nearby terminal by means of the short-range wireless communication in at least one of manners described below.

A wireless local area network is established with the nearby terminal by means of the short-range wireless communication, and the anomaly information of the vehicle is sent to the terminal during the establishment of the local area network.

The wireless local area network is established with the nearby terminal by means of the short-range wireless communication, and the anomaly information of the vehicle is sent to the terminal after the local area network is established.

In an embodiment, the short-range wireless communication includes at least one of: wireless fidelity (Wi-Fi) Direct or Bluetooth.

Figure 6:
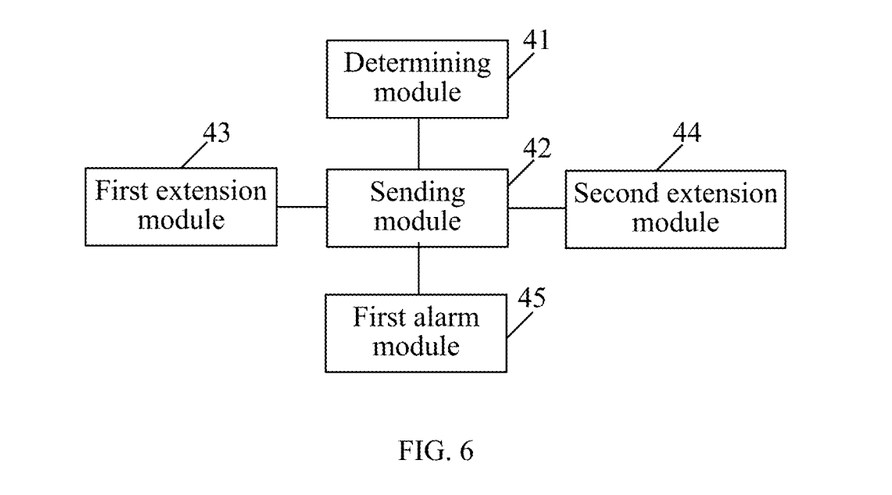
FIG. 6 is another schematic diagram of a vehicle warning apparatus (at a sending end) according to an embodiment of the present disclosure.

FIG. 6 is a schematic diagram of a vehicle warning apparatus (at a sending end) according to an embodiment of the present disclosure. As shown in FIG. 6, in an implementation manner, in a case where the short-range wireless communication is the Wi-Fi Direct, the apparatus further includes a first extension module 43. The first extension module 43 is configured to perform at least one of operations described below.

A terminal alarm traffic information attribute item is added in a peer-to-peer (P2P) attribute information field of information elements in a frame body of a Probe Request frame.

The terminal alarm traffic information attribute item is added in a P2P attribute information field of information elements in a frame body of a Probe Response frame.

In an embodiment manner, the sending module 42 is configured to: in a device discovery stage of the Wi-Fi Direct, carry the anomaly information of the vehicle in the terminal alarm traffic information attribute item to send the anomaly information of the vehicle to the terminal within the wireless local area network.

In an embodiment, in a case where the short-range wireless communication is the Bluetooth, the apparatus further includes a second extension module 44, as shown in FIG. 6.

The second extension module 44 is configured to add the terminal alarm traffic information attribute item in an attribute information field of information elements in a frame body of a probe information frame.

In an embodiment, the sending module 42 is configured to: in a device discovery stage of the Bluetooth, carry the anomaly information of the vehicle in the terminal alarm traffic information attribute item and send the anomaly information of the vehicle to the terminal within the wireless local area network.

In an embodiment, the sending module 42 is configured to convert the anomaly information of the vehicle into a terminal traffic alarm information code and carry the code in the terminal alarm traffic information attribute item.

In an embodiment, the sending module 42 is configured to send the anomaly information of the vehicle by an external radio frequency signal amplifying device of the terminal or an on-board radio frequency signal amplifying device.

In an embodiment, as shown in FIG. 6, the apparatus further includes a first alarm module 45.

The first alarm module 45 is configured to output alarm information according to the anomaly information.

In an embodiment, the sending module 42 is configured to bind the terminal within the local area network by means of authentication and authorization.

In an embodiment, the sending module 42 is configured to send the anomaly information by means of information encryption.

In the embodiments of the present disclosure, the short-range wireless communication is adopted, which is convenient, fast, and easy to be popularized, has low costs, and does not depend on 3G/4G or the GPS; communication is performed by a control bit extended for Wi-Fi Direct or Bluetooth, so that the anomaly information of the vehicle can be sent out during the establishment of the local area network, which further increases an information transmitting speed. The real-time information of the vehicle is acquired by the OBD or other diagnosis interfaces, implementing accurate and timely monitoring; and intelligent and interconnected driving assistance can be achieved based on the terminal for the vehicle without additional costs.

Figure 7:
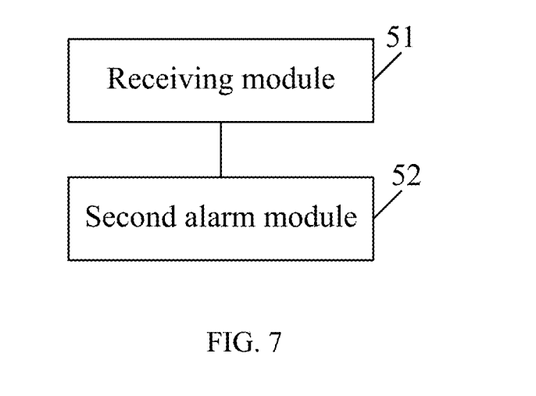
FIG. 7 is a schematic diagram of a vehicle warning apparatus (at a receiving end) according to an embodiment of the present disclosure.

As shown in FIG. 7, the embodiments of the present disclosure further provide a vehicle warning apparatus. The apparatus includes a receiving module 51 and a second alarm module 52.

The receiving module 51 is configured to receive, by means of short-range wireless communication, anomaly information of a vehicle sent by a nearby terminal.

The second alarm module 52 is configured to output alarm information according to the anomaly information.

In an embodiment, the receiving module 51 is configured to receive, by means of the short-range wireless communication, the anomaly information of the vehicle sent by the nearby terminal in at least one of manners described below.

A wireless local area network is established with the nearby terminal by means of the short-range wireless communication, and the anomaly information of the vehicle sent by the terminal is received during the establishment of the local area network.

The wireless local area network is established with the nearby terminal by means of the short-range wireless communication, and the anomaly information of the vehicle sent by the terminal is received after the local area network is established.

In an embodiment, the short-range wireless communication includes at least one of: wireless fidelity (Wi-Fi) Direct or Bluetooth.

In an embodiment, in a case where the short-range wireless communication is the Wi-Fi Direct, the receiving module is configured to: in a device discovery stage of the Wi-Fi Direct, receive a Probe Request frame, and acquire the anomaly information according to a terminal alarm traffic information attribute item in a peer-to-peer (P2P) attribute information field of information elements in a frame body of the Probe Request frame.

In an embodiment, the receiving module 51 is configured to parse a terminal traffic alarm information code carried in the terminal alarm traffic information attribute item to acquire the anomaly information.

In an embodiment, in a case where the short-range wireless communication is the Wi-Fi Direct, the receiving module is configured to: in the device discovery stage of the Wi-Fi Direct, receive a Probe Response frame, and acquire the anomaly information according to the terminal alarm traffic information attribute item in a P2P attribute information field of information elements in a frame body of the Probe Response frame.

In an embodiment, the receiving module 51 is configured to parse the terminal traffic alarm information code carried in the terminal alarm traffic information attribute item to acquire the anomaly information.

In an embodiment, in a case where the short-range wireless communication is the Bluetooth, the receiving module is configured to: in a device discovery stage of the Bluetooth, receive a probe information frame, and acquire the anomaly information according to the terminal alarm traffic information attribute item in an attribute information field of information elements in a frame body of the probe information frame.

In an embodiment, the receiving module 51 is configured to parse the terminal traffic alarm information code carried in the terminal alarm traffic information attribute item to acquire the anomaly information.

Figure 8:
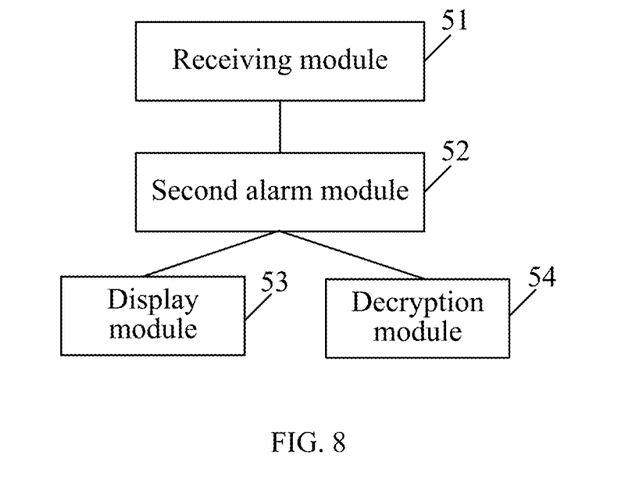
FIG. 8 is another schematic diagram of a vehicle warning apparatus (at a receiving end) according to an embodiment of the present disclosure.

FIG. 8 is another schematic diagram of a vehicle warning apparatus (at a receiving end) according to an embodiment of the present disclosure. As shown in FIG. 8, in an implementation manner, the apparatus further includes a display module 53.

The display module 53 is configured to: when a discovered terminal is displayed, display associated terminal traffic alarm information, where the terminal traffic alarm information corresponds to the terminal traffic alarm information code.

In an embodiment, the receiving module 51 is configured to receive the anomaly information of the vehicle via an external radio frequency signal amplifying device of a terminal or an on-board radio frequency signal amplifying device.

In an embodiment, the receiving module 51 is configured to bind the terminal within the local area network by means of authentication and authorization.

In an embodiment, the apparatus further includes a decryption module 54, which is configured to decrypt the received encrypted anomaly information.

In the embodiments described above, based on a Wi-Fi Direct protocol or a Bluetooth protocol supported by smart terminals, multiple smart terminals are linked to form the wireless local area network without the GPS or 3G/4G network coverage, and a software system run by the smart terminal receives the anomaly information sent by another vehicle within the wireless local area network and advises a driver, so as to avoid serial accidents or other forms of personnel and property damages.

The embodiments of the present disclosure further provide a vehicle warning apparatus, which includes a memory, a processor, and a computer program stored in the memory and executable by the processor, where the processor, when executing the computer program, implements the steps of the vehicle warning method shown in FIG. 1.

The embodiments of the present disclosure further provide a vehicle warning apparatus, which includes a memory, a processor, and a computer program stored in the memory and executable by the processor, where the processor, when executing the computer program, implements the steps of the vehicle warning method shown in FIG. 4.

The embodiments of the present disclosure further provide a computer-readable storage medium, which is configured to store computer-executable instructions for performing the vehicle warning method shown in FIG. 1.

The embodiments of the present disclosure further provide a computer-readable storage medium, which is configured to store computer-executable instructions for performing the vehicle warning method shown in FIG. 4.

In the embodiment, the storage medium may include, but is not limited to, a USB flash disk, a read-only memory (ROM), a random access memory (RAM), a mobile hard disk, a magnetic disk, an optical disk or another medium capable of storing program codes.

Apparently, it should be understood by those skilled in the art that the above-mentioned modules or steps in the embodiments of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the embodiments of the present disclosure are not limited to any particular combination of hardware and software.

Although the embodiments disclosed by the present disclosure are as described above, the content thereof is merely embodiments for facilitating the understanding of the present disclosure and is not intended to limit the present disclosure. Those skilled in the art to which the present disclosure pertains may make any modifications and changes on implementation forms and details without departing from the spirit and scope disclosed by the present disclosure, but the protection scope of the present disclosure is still subject to the scope defined by the appended claims.

INDUSTRIAL APPLICABILITY

In the embodiments of the present disclosure, the real-time information of the vehicle is acquired, and it is determined that the anomaly happens to the vehicle; and the anomaly information of the vehicle is sent to the nearby terminal by means of the short-range wireless communication. In the embodiments of the present disclosure, the short-range wireless communication is adopted, which is convenient and fast, easy to be popularized, has low costs, and does not depend on 3G/4G or the GPS. Communication is performed by the control bit extended for Wi-Fi Direct or Bluetooth, so that the anomaly information of the vehicle can be sent out during the establishment of the local area network, which further increases an information dissemination speed. The real-time information of the vehicle is acquired by the OBD or other diagnosis interfaces, and thus accurate and timely monitoring is implemented. Intelligent and interconnected driving assistance can be achieved based on the terminal for the vehicle without additional costs.

What is claimed is:

1. A vehicle warning method, comprising:
   acquiring real-time information of a vehicle, and determining that an anomaly happens to the vehicle; and
   sending anomaly information of the vehicle to a nearby terminal by means of short-range wireless communication;
   wherein sending the anomaly information of the vehicle to the nearby terminal by means of the short-range wireless communication comprises at least one of:
   establishing a wireless local area network with the nearby terminal by means of the short-range wireless communication, and sending the anomaly information of the vehicle to the terminal during the establishment of the local area network; or
   establishing a wireless local area network with the nearby terminal by means of the short-range wireless communication, and sending the anomaly information of the vehicle to the terminal after the local area network is established;
   wherein in a case where the short-range wireless communication is Wi-Fi Direct, the method further comprises at least one of:
   adding a terminal alarm traffic information attribute item in a peer-to-peer (P2P) attribute information field of information elements in a frame body of a Probe Request frame; or
   adding a terminal alarm traffic information attribute item in a P2P attribute information field of information elements in a frame body of a Probe Response frame;
   wherein sending the anomaly information of the vehicle to the terminal within the wireless local area network during the establishment of the local area network comprises:
   in a device discovery stage of the Wi-Fi Direct, carrying the anomaly information of the vehicle in the terminal alarm traffic information attribute item and sending the anomaly information of the vehicle to the terminal within the wireless local area network.

2. The method of claim 1, wherein the real-time information of the vehicle is acquired by at least one of: an on-board control and diagnosis system, a sensor of a terminal on the vehicle, a global positioning system (GPS) or a wireless network.

3. The method of claim 2, wherein the on-board control and diagnosis system comprises at least one of: an on-board diagnostics (ODB) system and interface, an on-board control computer, an on-board electronic control unit (ECU) or an on-board microcomputer system.

4. The method of claim 2, wherein the sensor comprises at least one of: an acceleration sensor, a gravity sensor, a light sensor, an infrared sensor or a gyroscope.

5. The method of claim 1, wherein the real-time information of the vehicle comprises at least one of: a speed of the vehicle, an acceleration of the vehicle, an engine speed, a working status of an engine, a working status of a gear box or position information of the vehicle.

6. The method of claim 1, wherein acquiring the real-time information of the vehicle, and determining that the anomaly happens to the vehicle comprises:
   determining whether a preset condition is satisfied according to the real-time information of the vehicle, and determining that the anomaly happens to the vehicle in response to determining that the preset condition is satisfied.

7. The method of claim 6, wherein the preset condition comprises at least one of the following:
   a fault happens to the vehicle;
   a reduction amount of a speed of the vehicle within specified time is greater than a speed change threshold; or
   a negative acceleration of the vehicle is greater than an acceleration threshold.

8. The method of claim 1, wherein in a case where the short-range wireless communication is the Bluetooth, the method further comprises: adding a terminal alarm traffic information attribute item in an attribute information field of information elements in a frame body of a probe information frame.

9. The method of claim 8, wherein sending the anomaly information of the vehicle to the terminal within the wireless local area network during the establishment of the local area network comprises:
   in a device discovery stage of the Bluetooth, carrying the anomaly information of the vehicle in the terminal alarm traffic information attribute item and sending the anomaly information of the vehicle to the terminal within the wireless local area network.

10. The method of claim 1, wherein carrying the anomaly information of the vehicle in the terminal alarm traffic information attribute item comprises:
    converting the anomaly information of the vehicle into a terminal traffic alarm information code and carrying the terminal traffic alarm information code in the terminal alarm traffic information attribute item.

11. The method of claim 1, wherein sending the anomaly information of the vehicle to the nearby terminal by means of the short-range wireless communication comprises:
    sending the anomaly information of the vehicle by an external radio frequency signal amplifying device of the terminal or an on-board radio frequency signal amplifying device.

12. The method of claim 1, further comprising: outputting alarm information according to the anomaly information.

13. The method of claim 12, wherein outputting the alarm information according to the anomaly information comprises at least one of:
    outputting video alarm information according to the anomaly information; or
    outputting audio alarm information according to the anomaly information.

14. The method of claim 1, wherein establishing the wireless local area network comprises:
    binding the terminal within the local area network by means of authentication and authorization.

15. The method of claim 1, wherein sending the anomaly information of the vehicle to the nearby terminal by means of the short-range wireless communication comprises: sending the anomaly information by means of information encryption.

16. A vehicle warning method, comprising:
    receiving, by means of short-range wireless communication, anomaly information of a vehicle sent by a nearby terminal; and
    outputting alarm information according to the anomaly information;
    wherein receiving, by means of the short-range wireless communication, the anomaly information of the vehicle sent by the nearby terminal comprises at least one of:
    establishing a wireless local area network with the nearby terminal by means of the short-range wireless communication, and receiving the anomaly information of the vehicle sent by the terminal during the establishment of the local area network; or
    establishing a wireless local area network with the nearby terminal by means of the short-range wireless communication, and receiving the anomaly information of the vehicle sent by the terminal after the local area network is established;
    wherein in a case where the short-range wireless communication is the Wi-Fi Direct, receiving the anomaly information of the vehicle sent by the terminal during the establishment of the local area network comprises at least one of:
    in a device discovery stage of the Wi-Fi Direct, receiving a Probe Request frame, acquiring the anomaly information according to a terminal alarm traffic information attribute item in a peer-to-peer (P2P) attribute information field of information elements in a frame body of the Probe Request frame; or
    in a device discovery stage of the Wi-Fi Direct, receiving a Probe Response frame, and acquiring the anomaly information according to a terminal alarm traffic information attribute item in a P2P attribute information field of information elements in a frame body of the Probe Response frame.

17. A vehicle warning apparatus, comprising:
    a processor; and
    a memory connected with the processor for storing instructions executable by processor,
    wherein execution of the instructions by the processor causes the processor to perform the vehicle warning method of claim 1.

18. A vehicle warning apparatus, comprising:
    a processor; and
    a memory connected with the processor for storing instructions executable by processor,
    wherein execution of the instructions by the processor causes the processor to perform the vehicle warning method of claim 16.

* * * * *

UNITED STATES PATENT AND TRADEMARK OFFICE
CERTIFICATE OF CORRECTION

Page 1 of 2

PATENT NO. : 11,062,604 B2
APPLICATION NO. : 16/652376
DATED : July 13, 2021
INVENTOR(S) : Kang et al.

It is certified that error appears in the above-identified patent and that said Letters Patent is hereby corrected as shown below:

In the Specification

In Column 2, Line 35, delete "(ODB)" and insert --(OBD)--.

In Column 3, Line 62, delete "ODB" and insert --OBD--.

In Column 3, Line 66, delete "ODB" and insert --OBD--.

In Column 8, Line 9, delete "ODB" and insert --OBD--.

In Column 11, Line 18, delete "ODB" and insert --OBD--.

In Column 11, Line 27, delete "ODB" and insert --OBD--.

In Column 11, Line 27, delete "ODB" and insert --OBD--.

In Column 11, Line 33, delete "ODB" and insert --OBD--.

In Column 12, Line 65, delete "ODB" and insert --OBD--.

In Column 13, Line 7, delete "ODB" and insert --OBD--.

In Column 13, Line 34, delete "ODB" and insert --OBD--.

In Column 13, Line 35, delete "ODB" and insert --OBD--.

In Column 13, Line 40, delete "ODB" and insert --OBD--.

In Column 13, Line 66, delete "ODB" and insert --OBD--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*

In Column 13, Line 67, delete "ODB" and insert --OBD--.

In Column 14, Line 12, delete "ODB" and insert --OBD--.

In Column 14, Line 41, delete "ODB" and insert --OBD--.

In Column 14, Line 42, delete "ODB" and insert --OBD--.

In Column 14, Line 57, delete "ODB" and insert --OBD--.

In Column 15, Line 26, delete "ODB" and insert --OBD--.

In Column 15, Line 33, delete "ODB" and insert --OBD--.

In the Claims

In Column 20, Line 49, Claim 3, delete "(ODB)" and insert --(OBD)--.